(12) United States Patent
Pokorny et al.

(10) Patent No.: US 11,461,414 B2
(45) Date of Patent: Oct. 4, 2022

(54) AUTOMATICALLY BUILDING A SEARCHABLE DATABASE OF SOFTWARE FEATURES FOR SOFTWARE PROJECTS

(71) Applicant: RED HAT, INC., Raleigh, NC (US)

(72) Inventors: Fridolin Pokorny, Modry Kamen (SK); Sanjay Arora, Jersey City, NJ (US); Christoph Goern, Bonn (DE)

(73) Assignee: RED HAT, INC., Raleigh, NC (US)

( * ) Notice: Subject to any disclaimer, the term of this patent is extended or adjusted under 35 U.S.C. 154(b) by 319 days.

(21) Appl. No.: 16/545,468

(22) Filed: Aug. 20, 2019

(65) Prior Publication Data
US 2021/0056146 A1 Feb. 25, 2021

(51) Int. Cl.
*G06F 16/953* (2019.01)
*G06F 8/70* (2018.01)

(52) U.S. Cl.
CPC .............. *G06F 16/953* (2019.01); *G06F 8/70* (2013.01)

(58) Field of Classification Search
CPC .................................. G06F 16/953; G06F 8/70
USPC ........................................................ 707/757
See application file for complete search history.

(56) References Cited

U.S. PATENT DOCUMENTS

| | | | | |
|---|---|---|---|---|
| 5,461,698 A * | 10/1995 | Schwanke | ............ | G06K 9/6253 706/31 |
| 6,212,549 B1 * | 4/2001 | Page | ................... | G06Q 10/10 719/329 |
| 8,275,796 B2 * | 9/2012 | Spivack | .................. | G06F 16/93 707/831 |
| 10,311,404 B1 * | 6/2019 | Lecue | .................... | G06Q 10/00 |
| 2008/0097938 A1 * | 4/2008 | Guyon | .................. | G16B 50/30 706/12 |
| 2009/0199090 A1 * | 8/2009 | Poston | .................. | G06F 16/907 707/999.102 |
| 2010/0241469 A1 * | 9/2010 | Weigert | ............. | G06F 11/3604 717/124 |
| 2013/0095864 A1 * | 4/2013 | Marovets | ........... | G06Q 30/0239 455/466 |
| 2013/0204874 A1 * | 8/2013 | Frey | ........................ | G06F 16/93 707/737 |

(Continued)

FOREIGN PATENT DOCUMENTS

| | | |
|---|---|---|
| CN | 109446414 A | 3/2019 |
| WO | 2018015963 A1 | 1/2018 |

OTHER PUBLICATIONS

Alon, U., et al., "code2vec: Learning Distributed Representations of Code," Technion and Facebook AI Research, Oct. 30, 2018, https://arxiv.org/pdf/1803.09473.pdf.

(Continued)

*Primary Examiner* — Mark E Hershley
(74) *Attorney, Agent, or Firm* — Kilpatrick Townsend & Stockton LLP (57) ABSTRACT

A searchable database of software features for software projects can be automatically built in some examples. One such example can involve analyzing descriptive information about a software project to determine software features of the software project. Then a feature vector for the software project can be generated based on the software features of the software project. The feature vector can be stored in a database having multiple feature vectors for multiple software projects. The multiple feature vectors can be easily and quickly searched in response to search queries.

18 Claims, 3 Drawing Sheets

(56) References Cited

U.S. PATENT DOCUMENTS

| | | | | |
|---|---|---|---|---|
| 2014/0090061 | A1* | 3/2014 | Avasarala | G06F 21/564 |
| | | | | 726/24 |
| 2015/0310497 | A1* | 10/2015 | Valin | G06Q 99/00 |
| | | | | 705/14.66 |
| 2017/0262633 | A1* | 9/2017 | Miserendino | G06K 9/6256 |
| 2018/0276562 | A1* | 9/2018 | Woulfe | G06N 3/0445 |
| 2019/0026697 | A1* | 1/2019 | Burton | G06F 8/71 |
| 2019/0318366 | A1* | 10/2019 | Carranza | G06Q 30/018 |
| 2020/0368616 | A1* | 11/2020 | Delamont | A63F 13/213 |

OTHER PUBLICATIONS

Dam, H.K., et al., "Towards Effective AI-powered Agile Project Management," University of Wollongong, Deakin University, Kyushu University, Dec. 27, 2018, https://arxiv.org/pdf/1812.10578.pdf.

Mou, L., et al., "Building Program Vector Representations for Deep Learning," Software Institute School of EECS, Peking University, Sep. 11, 2014, https://arxiv.org/pdf/1409.3358.pdf.

\* cited by examiner

AUTOMATICALLY BUILDING A SEARCHABLE DATABASE OF SOFTWARE FEATURES FOR SOFTWARE PROJECTS

TECHNICAL FIELD

The present disclosure relates generally to software development. More specifically, but not by way of limitation, this disclosure relates to automatically building a searchable database of software features for software projects.

BACKGROUND

Software projects are often stored in repositories accessible through websites, such as GitHub™. The repositories can contain files created throughout the lifecycle of the project. Examples of these files may include source code for the software project, code libraries, configuration files for installing or using the software project, readme files for describing aspects of the software project, and so on. These files may detail project requirements, functional requirements, design criteria, test data, and other information about the software project. Typically, the websites categorize software projects by keywords (e.g., topics or tags) in order to make identifying relevant software projects easier. The websites may also enable users to discuss the software projects (e.g., via a discussion forum), provide feedback to developers of the software projects, report bugs in the software projects, and download copies of the software projects.

DETAILED DESCRIPTION

Software developers may wish to discern if two software projects are sufficiently similar for various reasons, such as to use one software project as a replacement for another software project. But software projects often have hundreds or thousands of software features. A software feature is any functional characteristic of a software project, such as a framework relied on by the software project, a dependency (e.g., a code library or plugin) relied on by the software project, a programming language of the software project, other systems or software with which the software project is designed to interface, an executable format of the software project, types of algorithms implemented by the software project, etc. The large numbers of software features associated with any given software project makes it challenging or practically infeasible for a software developer to perform a meaningful comparison between software projects. These large numbers of software features also make it challenging for software developers to determine if software projects are fully compatible with their computing environments, since many of these software features can be defined internally and not explicitly described in relation to the software projects.

Some examples of the present disclosure overcome one or more of the abovementioned problems by automatically building a searchable database of software features for software projects. As one example, a system of the present disclosure can obtain descriptive information about a software project from one or more sources that may be internal or external to the software project. Examples of the descriptive information can include source code for the software project, configuration files or readme files provided with the software project, a description of the software project, or any combination of these. The descriptive information can be obtained from sources such as discussion threads on online forums, review websites, repositories, etc. The system can automatically analyze the descriptive information to determine software features of the software project. The system can then generate a feature vector for the software project based on the software features. A feature vector is a data structure containing elements, where each element is a numerical value indicating whether a particular software feature corresponding to the element is present or not present in a related software project. The data structure need not necessarily be a vector. After generating the feature vector, the system can store the feature vector in a database to enable the feature vector to be searched during a subsequent search process in response to a search query. The system can automatically repeat this process for dozens or hundreds of software projects to enable easy and fast searching and comparing of the software projects.

One simplified example of a feature vector may be {1, 1, 0, 0, 0, 0, 1, 0}, though typical feature vectors may have hundreds or thousands of elements. In this simplified example, the elements of the feature vector can correspond to the following exemplary software features, respectively: {python, machine-learning, web, django-framework, webassembly, sql, spark, gpu-support, java}. A binary value of 1 can indicate the presence of the software feature and a binary value of 0 can indicate the absence of the software feature, though other schemes are possible. In some instances, the numerical values of the elements may include decimal values, which can indicate a degree of likelihood that a software project has a particular software feature. The system can store a relationship between the feature vector and an identifier of its corresponding software project in the database. The feature vector can then be easily and quickly searched or compared to another feature vector to determine relationships between the corresponding software projects.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
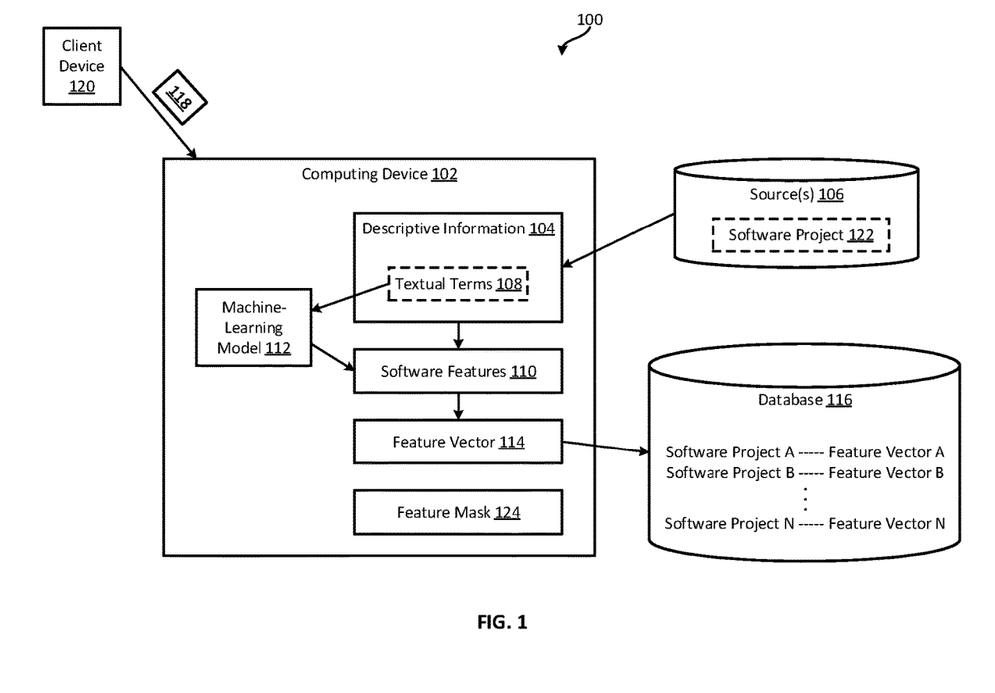
FIG. 1 is a block diagram of an example of a system for automatically building a database of software features for software projects according to some aspects.

FIG. 1 is a block diagram of an example of a system 100 for automatically building a database 116 of software features for software projects according to some aspects. The system 100 includes a computing device 102, which may be a server, desktop computer, laptop computer, etc.

The computing device 102 can obtain descriptive information 104 about a software project 122, such as a software application or package. Examples of the descriptive information 104 can include feedback, reviews, questions, or comments about the software project; source code for the software project; configuration files or readme files provided with the software project; keywords characterizing the software project; a description of the software project; or any combination of these. The computing device 102 can obtain the descriptive information 104 from one or more sources 106 (e.g., over the Internet). Examples of the source(s) 106 can include one or more websites, such as discussion forums, repositories, review websites, or any combination of these. The source(s) 106 can also include parts of the software project 122, such as readme files, configuration files, or source code files.

As one particular example, the computing device 102 can access a website for an online repository. The website can have a description of the software project 122 and host source code for the software project 122. The website can also list keywords (e.g., topics or tags) characterizing the software project 122. The keywords may have previously been input by users or automatically generated by the website. The website may further have a feedback section, through which users can post comments, reviews, questions, and bugs relating to the software project 122. The computing device 102 can access the website to retrieve some or all of this information.

After obtaining the descriptive information 104 for the software project 122, the computing device 102 can parse the descriptive information 104 to determine software features 110 of the software project 122. The software features 110 can be any functional characteristics of the software project 122 relating to how the software project 122 works or operates. For example, the software features 110 can include tasks and functions that the software project 122 is configured to perform, frameworks and dependencies relied on by the software project 122, operating systems and operating environments for the software project 122, or any combination of these. The computing device 102 can determine the software features 110 based on the descriptive information 104 using any number and combination of techniques.

As one particular example, the descriptive information 104 may include website content scraped from a website, such as stackoverlow™. The website content can include a question relating to the software project 122, along with keywords characterizing the software project 122. The keywords may have previously been input by the user posing the question. In some such examples, the computing device 102 can determine the software features 110 by parsing the keywords from the website content and using at least some of those keywords as the software features 110.

As another example, the computing device 102 can apply a count technique to the descriptive information 104 to determine the software features 110. The count technique can involve counting how many times a particular textual term occurs in the descriptive information 104 and storing that count value. For example, if the textual term "Python" is present 32 times in the descriptive information 104, then the count for that textual term would be 32. The computing device 102 can iterate this process to determine counts for some or all of the textual terms in the descriptive information 104. The computing device 102 can then determine which of the textual terms have counts exceeding a predefined threshold (e.g., 30). Those textual terms may indicate particularly important software features. So, at least some of those textual terms may be designated as the software features 110. In some cases, a portion of the textual terms may be filtered out (e.g., using a predefined filter list) as irrelevant, for example, because they are articles, prepositions, or otherwise relatively common textual terms that provide little value, to improve accuracy.

As still another example, the computing device 102 can apply a machine-learning model 112 to the descriptive information 104 to determine the software features 110.

Examples of the machine-learning model 112 can include a deep neural network, a Naïve Bias classifier, or a support vector machine. The machine-learning model 112 can be configured to analyze textual information and identify software features 110 therein. For example, the machine-learning model 112 may include a deep neural network that is trained using training data. Each entry in the training data can include a relationship between a keyword and a flag indicating whether or not the keyword relates to a software feature. The machine-learning model 112 can learn these relationships and then able to reliably predict whether or not an unknown keyword relates to a software feature.

The computing device 102 can apply any number and combination of techniques discussed above to determine the software features 110 of the software project 122. The computing device 102 can additionally or alternatively apply other techniques, such as term frequency-inverse document frequency ("TF-IDF"), to determine the software features 110 of the software project 122. TF-IDF may involve generating a numerical statistic that reflects how important a word is to a document in a corpus. In the present context, the document may be a file or website associated with the software project 122 and the corpus is the descriptive information 104. The TF-IDF value increases proportionally to the number of times a word appears in the document and is offset by the number of documents in the corpus that contain the word, which helps to adjust for the fact that some words appear more frequently in general.

Having determined the software features 110 of the software project 122, the computing device 102 can next determine a feature vector 114 for the software project 122. In some examples, the computing device 102 can determine the feature vector 114 for the software project 122 by first generating a default feature vector in which all the elements have default values (e.g., zeros). One simplified example of the default feature vector can be {0, 0, 0, 0, 0, 0}. Each element in the default feature vector can be mapped to a particular software feature. For example, the elements in the above default feature vector can be mapped to the following: {C++, Openshift, Tensorflow, Linux, Machine-learning, Python}. If the computing device 102 determined that the software project 122 has a particular software feature, the computing device 102 can then modify the corresponding element's value in the default feature vector to so indicate. For example, if the computing device 102 determined that software project 122 relies on "tensorflow" (an open source machine-learning library for research and production), then the computing device 102 can change the third element's value to one, yielding a feature vector of {0, 0, 1, 0, 0, 0}. The computing device 102 can repeat this process for each of the software features 110 to generate the feature vector 114 for the software project 122.

After generating the feature vector 114 for the software project 122, the computing device 102 can store the feature vector 114 in a database 116. The database 116 may be internal or external to the computing device 102. For example, the database 116 may be remote from the computing device 102 and accessible to the computing device 102 via the Internet.

The computing device 102 can repeat the above process for any number and combination of software projects to automatically build (e.g., construct) the database 116. This can yield a database 116 with N entries, which can be hundreds or thousands of entries for hundreds or thousands of software projects. Each entry can include a relationship between a software project and its feature vector. For example, the database 116 depicted in FIG. 1 includes a relationship between Software Project A and Feature Vector A, another relationship between Software Project B and Feature Vector B, and another relationship between Software Project N and Feature Vector N.

These entries in the database 116 may be searchable and comparable to perform various computing tasks. For example, the computing device 102 can receive one or more search queries 118 from a client device 120, which may be a desktop computer, laptop computer, or mobile device. A search query 118 can be a request to identify one or more software projects in the database 116 that have a particular set of software features. The computing device 102 can then execute a search process in response to the one or more search queries 118.

In some examples, the search process can involve the computing device 102 generating a feature mask 124 based on the particular set of software features associated with a search query 118. A feature mask 124 is a data structure containing elements with values defining criteria for a search. The data structure may or may not be a vector. The feature mask 124 may have as many elements as are present in the feature vectors, and the feature mask 124 may have a similar mapping of elements-to-software features as the feature vectors. In some examples, each element in the feature mask 124 can be a binary value indicating whether or not a software feature corresponding to the element is to limit the search. A binary value of 1 may indicate that presence of the software feature is required, while a binary value of 0 may indicate that the presence of the software feature is optional.

For example, the computing device 102 can determine the feature mask 124 associated with the search query 118 by first generating a default feature mask in which all the elements have default values (e.g., zeros). One simplified example of the default feature mask can be {0, 0, 0, 0, 0, 0}. Each element in the default feature mask can be mapped to a particular software feature. For example, the elements in the above default feature mask can be mapped to the following: {C++, Openshift, Tensorflow, Linux, Machine-learning, Python}. If the search query 118 indicates that a particular software feature is to be searched, the computing device 102 can then modify the corresponding element's value in the default feature mask to so indicate. For example, if the search query 118 is for software projects that are compatible with Openshift and Linux, then the computing device 102 can change the second and fourth elements' values to one, yielding a feature mask 124 of {0, 1, 0, 1, 0, 0}.

After determining the feature mask 124, the computing device 102 can apply the feature mask 124 to some or all of the feature vectors in the database 116 to determine search results, which may consist of a subset of feature vectors having the particular set of software features requested in the search query 118. Applying the feature mask 124 to a feature vector in the database 116 may involve comparing the feature mask 124 to the feature vector or performing mathematical operations using the feature vector and the feature mask 124. For example, applying the feature mask 124 to the feature vector in the database 116 may involve comparing the feature mask 124 to the feature vector determine if the feature vector has values of one at the appropriate elements designated in the feature mask 124. As another example, applying the feature mask 124 to the feature vector in the database 116 may involve performing a bitwise AND operation between the feature mask 124 and the feature vector. As yet another example, applying the feature mask 124 to the feature vector in the database 116 may involve determining a distance (e.g., Euclidian distance) between the feature mask 124 and the feature vector, where the computing device 102 may return as search results only those feature vectors having distances that are below a predefined threshold. Regardless of the approach, the computing device 102 determine one or more software projects having the particular set of features identified in the search query 118 by using the feature mask 124.

In some examples, the search query 118 may be a request to identify a closest match to a software project 122. The closest match can be another software project having the largest number of software features in common with the software project 122 among all of the other software projects in the database 116. In some examples, the computing device 102 can determine the closest match by determining distances (e.g., Euclidian distances) between the feature vector for the software project 122 and each of the other feature vectors for the other software projects in the database 116. Whichever of the other software projects in the database 116 has the closest distance to the feature vector for the software project 122 can be the closest match to the software project 122.

In some examples, the search query 118 may be for some combination of the above. As one particular example, the software project 122 may be Tensorflow and have a feature vector of {1, 1, 0, 0, 0, 0, 0, 1, 0}. The feature vector may correspond to the following software features, respectively: {python, machine-learning, web, Django-framework, webassembly, sql, spark, gpu-support, java}. Thus, the feature vector indicates that Tensorflow requires Python. The user submit a search query 118 for other software projects in the database 116 that are similar to Tensorflow, but suitable for a Java ecosystem rather than a Python ecosystem. To effectuate such a search, the computing device 102 can generate a feature mask 124 based on the search query 118. One example of the feature mask 124 is {0, 1, 1, 1, 1, 1, 1, 1, 1}. The computing device 102 can then apply this feature mask 124 to all of the feature vectors in the database 116 to determine a refined search space that excludes software projects requiring Python. The computing device 102 can also generate a modified feature vector for Tensorflow based on the feature mask 124. For example, the computing device 102 can apply a bitwise AND operation between the feature vector for Tensorflow and the feature mask 124 to determine a modified feature vector of {0, 1, 0, 0, 0, 0, 0, 1, 0}. The computing device 102 can then determine distances between the modified feature vector for Tensorflow and each of the other feature vectors for the other software projects in refined search space. Whichever of the other software projects in the refined search space has the closest distance to the modified feature vector can be the closest match to Tensorflow. This example is simply illustrative and a similar process can be applied to software projects other than Tensorflow. Similarly, other examples can involve a more components, fewer components, or a different arrangement of the components shown in FIG. 1

Figure 2:
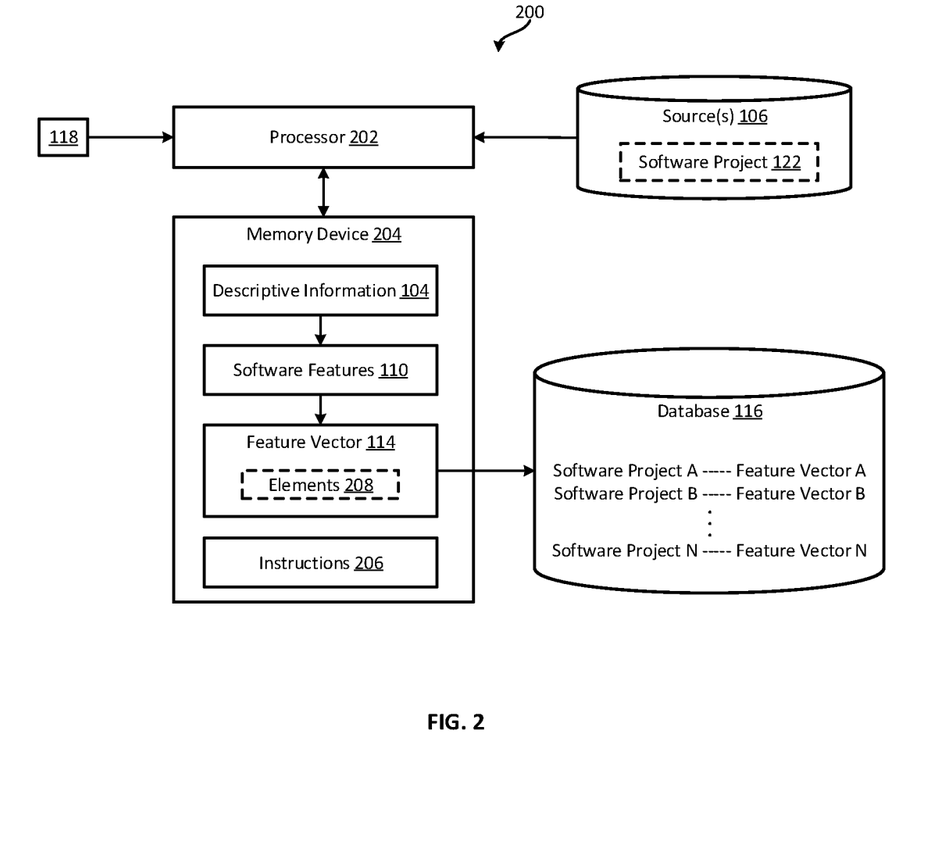
FIG. 2 is a block diagram of another example of a system for automatically building a database of software features for software projects according to some aspects.

FIG. 2 is a block diagram of another example of a system 200 for automatically building a database 116 of software features for software projects according to some aspects. The system 200 includes a processor 302 communicatively coupled with a memory device 204. The processor 302 and the memory device 204 may or may not be part of a computing device, such as computing device 102.

The processor 302 can include one processor or multiple processors. Non-limiting examples of the processor 302 include a Field-Programmable Gate Array (FPGA), an application-specific integrated circuit (ASIC), a microprocessor, etc. The processor 202 can execute instructions 206 stored in the memory device 204 to perform operations. In some examples, the instructions 206 can include processor-specific instructions generated by a compiler or an interpreter from code written in any suitable computer-programming language, such as C, C++, C #, etc.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a medium from which the processor 202 can read instructions 206. A non-transitory computer-readable medium can include electronic, optical, magnetic, or other storage devices capable of providing the processor 302 with computer-readable instructions 206 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 206.

In some examples, the processor 202 can analyze descriptive information 104 about a software project 122 to determine software features 110 of the software project 122. The processor 202 can then generate a feature vector 114 for the software project 122 based on the software features 110 of the software project 122. The feature vector 114 can be a vector of elements 208 in which each element is a numerical value indicating whether a particular software feature corresponding to the element is among the software features 110 of the software project 122 as determined from the descriptive information 104. The processor 202 can then store the feature vector 114 in a database 116 having a group of feature vectors for a group of software projects. The group of feature vectors can be searchable in response to search queries 118.

Figure 3:
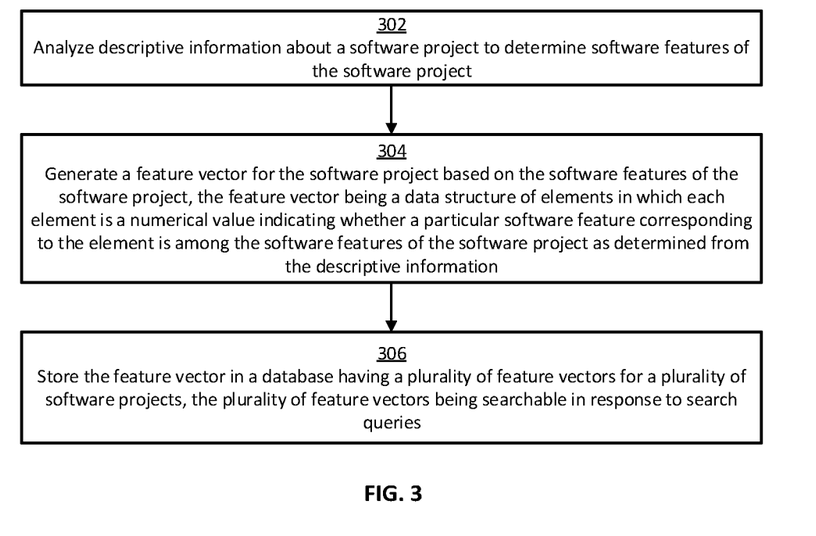
FIG. 3 is a flow chart of an example of a process for automatically building a database of software features for software projects according to some aspects.

In some examples, the processor 202 can perform one or more of the steps shown in FIG. 3 according to some aspects. In other examples, the processor 202 can implement more steps, fewer steps, different steps, or a different order of the steps depicted in FIG. 3. The steps of FIG. 3 are described below with reference to components discussed above.

In block 302, a processor 202 analyzes descriptive information 104 about a software project 122 to determine software features 110 of the software project 122. For example, the processor 202 can obtain the descriptive information 104 from one or more sources. The processor 202 can then apply a count technique and/or a machine-learning model to the descriptive information 104 to determine software features 110 of the software project 122.

In block 304, the processor 202 generates a feature vector 114 for the software project 122 based on the software features 110 of the software project 122. The feature vector 114 can be a data structure (e.g., vector) of elements 208 in which each element is a numerical value indicating whether a particular software feature corresponding to the element is among the software features 110 of the software project 122 as determined from the descriptive information 104. The processor 202 can generate the feature vector 114 by setting element values (e.g., bit values) in the feature vector 114 based on the software features 110 of the software project 122.

In block 306, the processor 202 stores the feature vector 114 in a database 116 having a plurality of feature vectors for a plurality of software projects. The plurality of feature vectors can be searchable in response to search queries 118.

In some examples, the blocks 302-306 can be repeated for as many software projects as desired to automatically construct a database 116 of feature vectors, which can be easily searched and compared. This may enable developers to quickly and accurately identify software applications that are compatible with their specific computing environments, that satisfy particular computing criteria, and/or that can serve as suitable replacements for existing software applications in their computing environments.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. Some examples can be combined with other examples to yield further examples.

The invention claimed is:

1. A system comprising:
a processor; and
a memory device includes instructions that are executable by the processor for causing the processor to:
analyze descriptive information about a software project to determine software features of the software project, the software features being functional characteristics of the software project;
generate a feature vector containing elements that represent a predefined set of software features and that have values indicating whether the predefined set of software features are present in the software project;
configure the values of the elements based on the software features determined from the descriptive information, so that a value of an element in the feature vector indicates that the software project includes a predefined software feature represented by the element, and so that another value of another element in the feature vector indicates that the software project excludes another predefined software feature represented by the other element; and
store the feature vector in a database having a plurality of feature vectors for a plurality of software projects, the plurality of feature vectors being searchable in response to search queries;
receive a search query for identifying one or more software projects from among the plurality of software projects, wherein the search query specifies a particular set of software features to be searched for from among the predefined set of software features;
in response to the search query, generate a feature mask based on the particular set of software features, the feature mask being separate from the feature vector and including plurality of elements in which each element is a binary value indicating whether a respective software feature corresponding to the element is among the particular set of software features to be searched; and
execute a search process for the one or more software projects by comparing the feature mask to each feature vector among the plurality of feature vectors, wherein the search process yields a subset of feature vectors from among the plurality of feature vectors having the particular set of software features.

2. The system of claim 1, wherein the particular set of software features searched in the search process is a subset of the software features of the software project, and wherein the memory device further includes instructions that are executable by the processor for causing the processor to:
- generate a modified feature vector based on the feature mask;
- determine a plurality of vector distances between the modified feature vector and the subset of feature vectors resulting from the search process, each vector distance among the plurality of vector distances being determined between the modified feature vector and a respective feature vector among the subset of feature vectors; and
- determine that a closest match to the software project is whichever software project among the plurality of software projects has a smallest vector distance among the plurality of vector distances.

3. The system of claim 2, wherein the memory device further includes instructions that are executable by the processor for causing the processor to generate the modified feature vector based on the feature mask by performing a bitwise AND operation between the modified feature vector and the feature mask.

4. The system of claim 1, wherein the memory device further includes instructions that are executable by the processor for causing the processor to obtain the descriptive information about the software project from at least one source that is external to the software project.

5. The system of claim 4, wherein the at least one source includes one or more websites.

6. The system of claim 5, wherein the one or more websites include a discussion thread for discussing the software project and a repository for storing source code for the software project.

7. The system of claim 5, wherein the descriptive information includes keywords characterizing the software project on the one or more websites.

8. The system of claim 1, wherein the memory device further includes instructions that are executable by the processor for causing the processor to obtain the descriptive information about the software project from part of the software project.

9. The system of claim 8, wherein the memory device further includes instructions that are executable by the processor for causing the processor to obtain the descriptive information about the software project from a configuration file or a readme file provided separately from source code for the software project.

10. The system of claim 8, wherein the memory device further includes instructions that are executable by the processor for causing the processor to obtain the descriptive information about the software project from source code for the software project.

11. The system of claim 1, wherein the memory device further includes instructions that are executable by the processor for causing the processor to determine the software features of the software project by:
- determining a plurality of counts corresponding to a plurality of textual terms in the descriptive information, each respective count among the plurality of counts indicating how many times a respective textual term is present in the descriptive information;
- determining a subset of textual terms from among the plurality of textual terms having respective counts above a predefined threshold; and
- designating the subset of textual terms as the software features for the software project.

12. The system of claim 1, wherein the memory device further includes instructions that are executable by the processor for causing the processor to determine the software features of the software project by applying a machine-learning model to the descriptive information about the software project.

13. A method comprising:
- analyzing, by a processor, descriptive information about a software project to determine software features of the software project, the software features being functional characteristics of the software project;
- generating, by the processor, a feature vector containing elements that represent a predefined set of software features and that have values indicating whether the predefined set of software features are present in the software project;
- configuring, by the processor, the values of the elements based on the software features determined from the descriptive information, so that a value of an element in the feature vector indicates that the software project includes a predefined software feature represented by the element, and so that another value of another element in the feature vector indicates that the software project excludes another predefined software feature represented by the other element;
- storing, by the processor, the feature vector in a database having a plurality of feature vectors for a plurality of software projects, the plurality of feature vectors being searchable in response to search queries;
- receiving a search query for identifying one or more software projects from among the plurality of software projects, wherein the search query specifies a particular set of software features to be searched for from among the predefined set of software features;
- in response to the search query, generating a feature mask based on the particular set of software features, the feature mask being separate from the feature vector and including plurality of elements in which each element is a binary value indicating whether a respective software feature corresponding to the element is among the particular set of software features to be searched; and
- executing a search process for the one or more software projects by comparing the feature mask to each feature vector among the plurality of feature vectors, wherein the search process yields a subset of feature vectors from among the plurality of feature vectors having the particular set of software features.

14. The method of claim 13, wherein the particular set of software features searched in the search process is a subset of the software features of the software project, and further comprising:
- generating a modified feature vector based on the feature mask;
- determining a plurality of vector distances between the modified feature vector and the subset of feature vectors resulting from the search process, each vector distance among the plurality of vector distances being determined between the modified feature vector and a respective feature vector among the subset of feature vectors; and
- determining that a closest match to the software project is whichever software project among the plurality of software projects has a smallest vector distance among the plurality of vector distances.

15. The method of claim 13, further comprising obtaining the descriptive information from one or more websites.

16. The method of claim 13, further comprising obtaining the descriptive information about the software project from a configuration file or a readme file provided with the software project, wherein the configuration file and the readme file are separate from source code for the software project.

17. The method of claim 13, further comprising determining the software features of the software project by:
- determining a plurality of counts corresponding to a plurality of textual terms in the descriptive information, each respective count among the plurality of counts indicating how many times a respective textual term is present in the descriptive information;
- determining a subset of textual terms from among the plurality of textual terms having respective counts above a predefined threshold; and
- designating the subset of textual terms as the software features for the software project.

18. A non-transitory computer-readable medium comprising program code that is executable by a processor for causing the processor to:
- analyze descriptive information about a software project to determine software features of the software project, the software features being functional characteristics of the software project;
- generate a feature vector containing elements that represent a predefined set of software features and that have values indicating whether the predefined set of software features are present in the software project;
- configure the values of the elements based on the software features determined from the descriptive information, so that a value of an element in the feature vector indicates that the software project includes a predefined software feature represented by the element, and so that another value of another element in the feature vector indicates that the software project excludes another predefined software feature represented by the other element;
- store the feature vector in a database having a plurality of feature vectors for a plurality of software projects, the plurality of feature vectors being searchable in response to search queries;
- receive a search query for identifying one or more software projects from among the plurality of software projects, wherein the search query specifies a particular set of software features to be searched for from among the predefined set of software features;
- in response to the search query, generate a feature mask based on the particular set of software features, the feature mask being separate from the feature vector and including plurality of elements in which each element is a binary value indicating whether a respective software feature corresponding to the element is among the particular set of software features to be searched; and
- execute a search process for the one or more software projects by comparing the feature mask to each feature vector among the plurality of feature vectors, wherein the search process yields a subset of feature vectors from among the plurality of feature vectors having the particular set of software features.

\* \* \* \* \*